(12) United States Patent
Hsieh

(10) Patent No.: US 6,735,377 B1
(45) Date of Patent: May 11, 2004

(54) CONTROL DEVICE FOR CD PLAYER

(75) Inventor: David Hsieh, Taipei (TW)

(73) Assignee: M. E. T. Technology Co., Ltd., Taipei (TW)

( * ) Notice: Subject to any disclaimer, the term of this patent is extended or adjusted under 35 U.S.C. 154(b) by 0 days.

(21) Appl. No.: 09/514,689

(22) Filed: Feb. 28, 2000

(51) Int. Cl.[7] .............................................. H04N 5/781
(52) U.S. Cl. .................................... 386/125; 369/30.01
(58) Field of Search ......................... 386/45, 125, 126; 369/24.01, 30.01, 30.27, 33.01, 30.3, 30.44, 2, 292; 348/231.5; 708/100

(56) References Cited

U.S. PATENT DOCUMENTS

| | | | | |
|---|---|---|---|---|
| 5,621,458 A | * | 4/1997 | Mann et al. | 348/231.5 |
| 5,689,484 A | * | 11/1997 | Hirasawa | 369/30.3 |
| 5,910,933 A | * | 6/1999 | Moore | 369/2 |
| 6,006,243 A | * | 12/1999 | Karidis | 708/100 |

* cited by examiner

*Primary Examiner*—Thai Tran
*Assistant Examiner*—Christopher Onuaku

(57) ABSTRACT

A control device to drive and control the CD player or CD writer to operate without any computer available is disclosed. The control device includes a CD player base and a control panel base connected to the base. The control panel base includes a LCD display and a control panel with a plurality of keys. An interface slot and a plurality of terminal ports are located on the front and back of the control panel base, respectively. The control device further includes a CPU, which is connected to audio-in/out ports, video in/out ports, speaker microphone, LCD display, power port, remote control keyboard, CD/RW Driver, and expanded memory/ROM so that the CD player can operate to play the CD without support by the computer when the interface port of the CD player is inserted to the interface slot.

1 Claim, 4 Drawing Sheets

CONTROL DEVICE FOR CD PLAYER

FIELD OF THE INVENTION

The present invention relates to a control device, and more specifically, to a device to control and drive the compact disk (CD) player or CD writer to operate without personal computer or notebook computer.

BACKGROUND OF THE INVENTION

The present commercial external CD player needs a personal computer or a notebook computer to drive and control so as to play the CD by some appropriate driving program. Thus, the CD player can not operate alone. The conventional CD writer is also controlled by the computer to correctly operate. Both CD player and CD writer are limited to localized use and results in some inconvenience.

Therefore, it has been greatly needed to create a control device with simpler structure and lighter weight to control and drive the CD player or writer to operate.

SUMMARY OF THE INVENTION

An object of the present invention is to provide a control device to drive the CD player. The control device is connected to a conventional CD player so as to operate to play CD movie or music CD without any computer.

Another object of the present invention is to provide a control device to drive the CD player. The control device is light and easy to carry.

Further object of the present invention is to provide a control device to drive the CD/RW player. The control device is coordinated with any external type of CD player.

The control device of the present invention comprises a CD player base and a control panel base connected to the base. The control panel base includes a LCD display and a control panel with a plurality of keys. An interface slot and a plurality of terminal ports are located on the front and back of the control panel base, respectively. The control device further includes a CPU, which is connected to audio in/out ports, video in/out ports, speaker, microphone, LCD display, power port, remote control keyboard, CD/RW Driver, and expanded memory/ROM so that the CD/RW player can operate to play the CD/RW without support by the computer when the interface port of the CD/RW player is inserted to the interface slot.

Other features and advantages of the invention will become apparent from the following description of the invention that refers to the accompanying drawings.

DETAILED DESCRIPTION OF THE PREFERRED EMBODIMENTS

Figure 1:
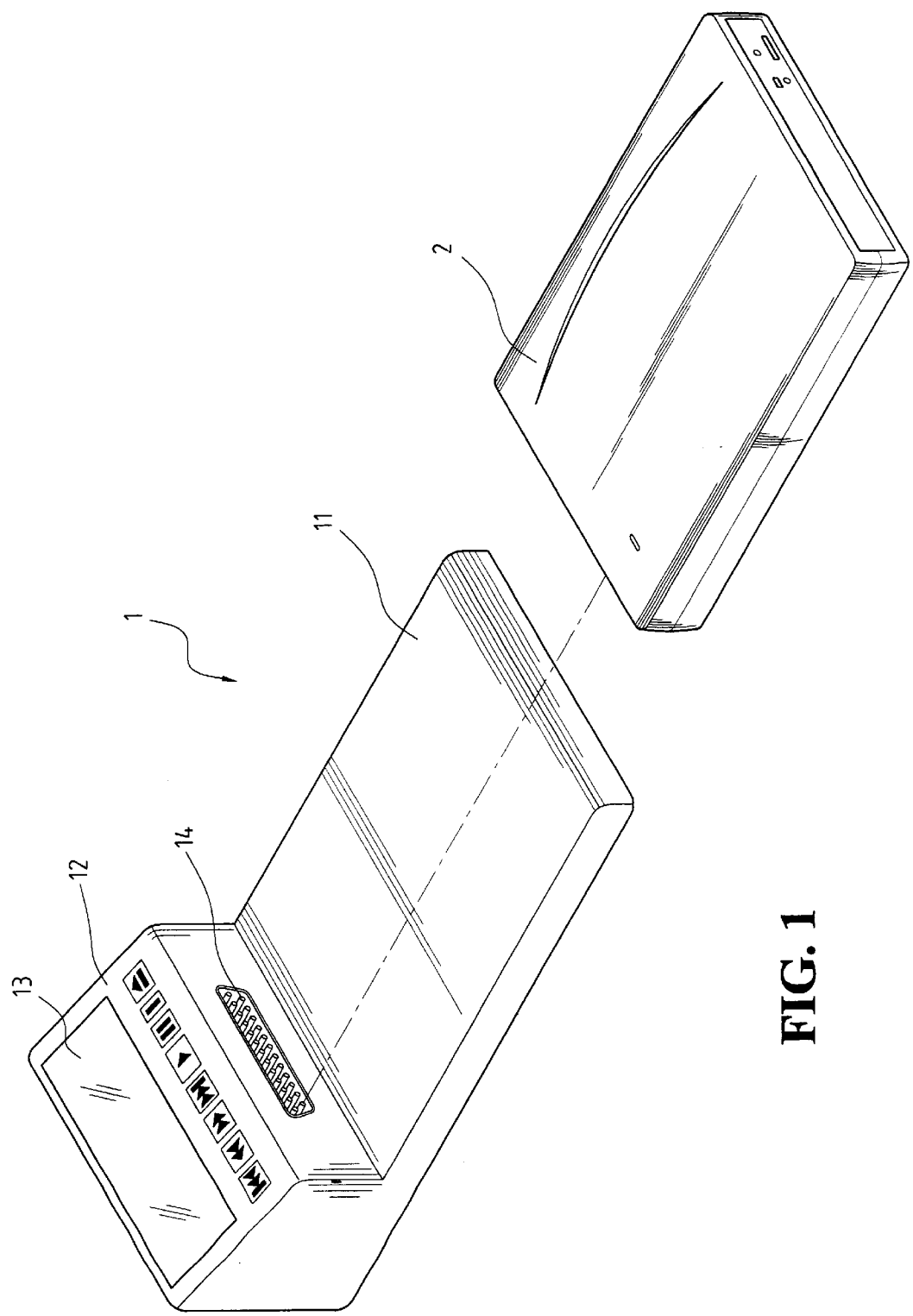
FIG. 1 is a three-dimensional view of the control device according to the present invention.
Figure 2:
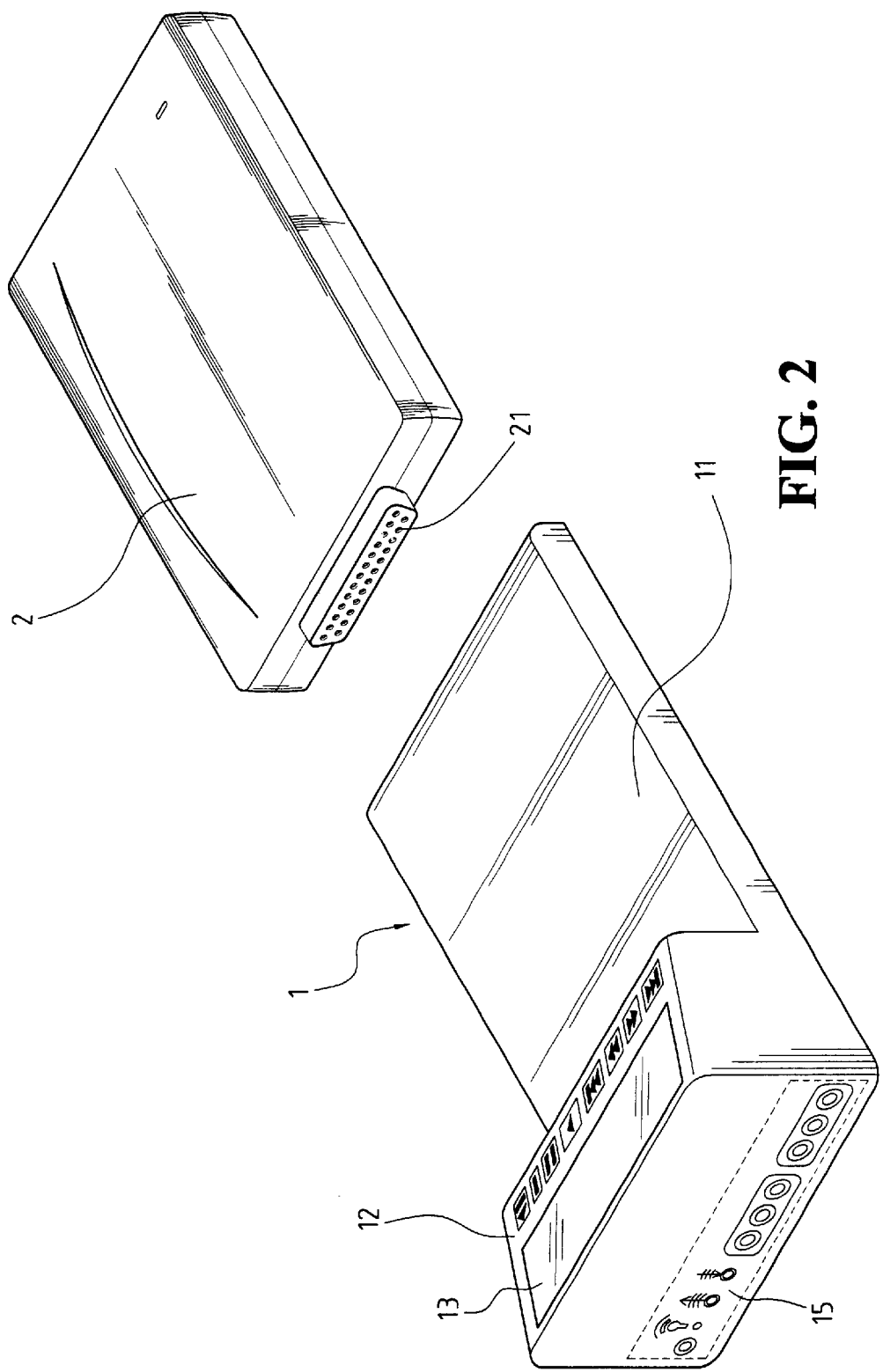
FIG. 2 is another three-dimensional view of the control device according to the present invention.
Figure 3:
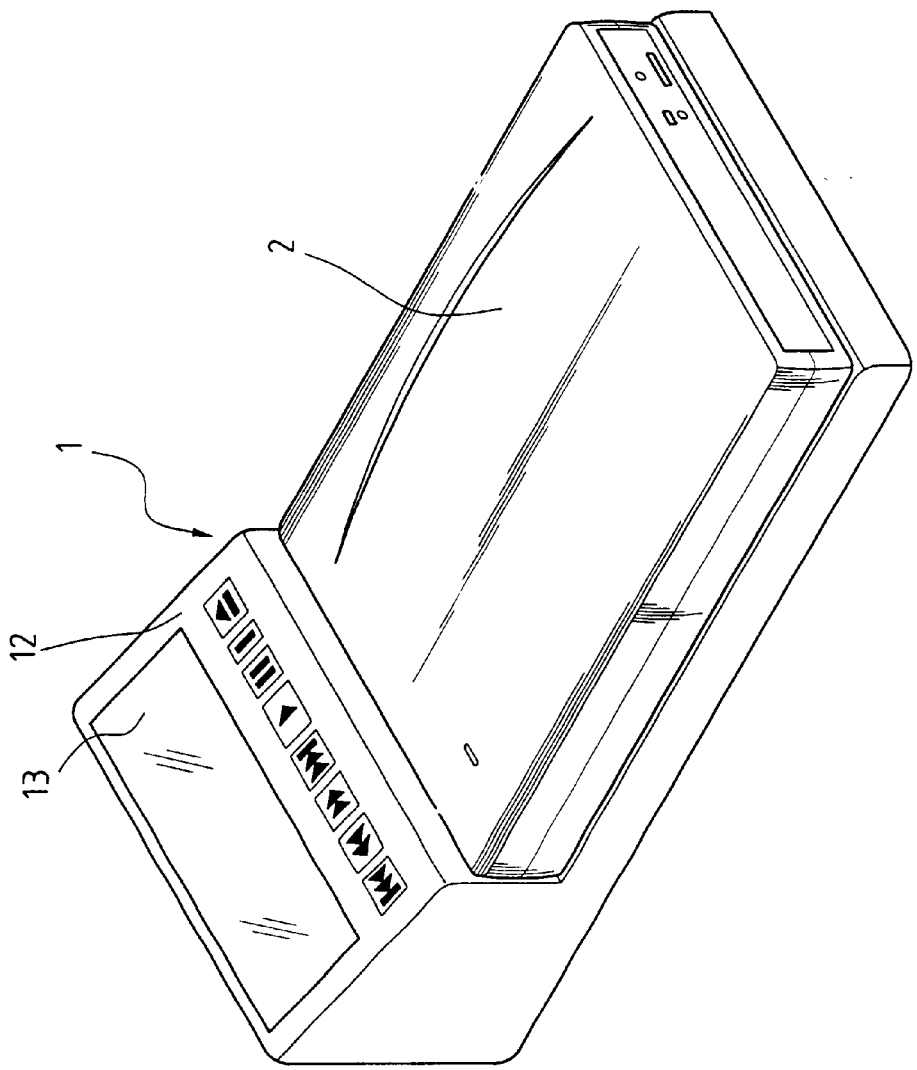
FIG. 3 shows a three-dimensional view of the control device and the CD player after being assembled.

With reference to FIGS. 1 and 2, showing two three-dimensional schematic diagram of the control device according to the present invention. The control device 1 consists of a CD player base 11 and a control panel base 12 connected to the base 11. The control panel base 12 has an oblique plane higher than the CD player base 11. A LCD display 13 and a plurality of keys are installed on the oblique plane. An interface slot 14 is located on the front of the control panel base towards the CD player base 11. A plurality of terminal ports 15 are installed on the back of the control panel base opposite the CD player base 11. The terminal ports 15 include audio in/out port ports, video in/out ports, power port, earphone port, and so forth. The interface slot 14 is provided to coordinate with the interface port 21 of the CD player 2 to insert (as shown in FIG. 3).

Figure 4:
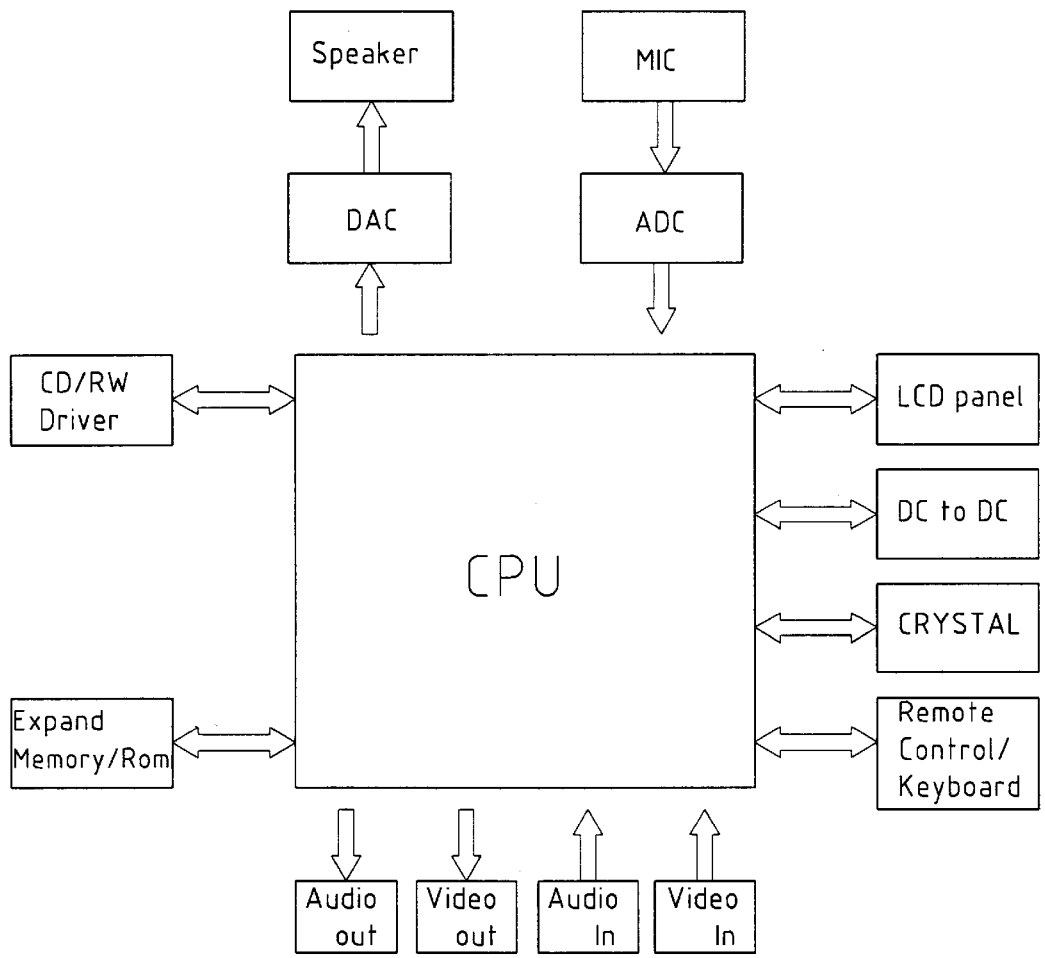
FIG. 4 illustrates the schematic block diagram of the internal circuit in the control device according to the present invention.

With reference to FIG. 4, a CPU (central processing unit) is further included in the control device 1, which is connected to audio in/out ports, video in/out ports, speaker, microphone, LCD.display, power port, remote control keyboard, CD/RW Driver, and expanded memory/ROM. The CPU is first connected to a DAC (digital to analog converter) and then to a speaker. Since the interface port 21 of the CD player 2 is inserted into the interface slot 14 of the CD player base 11, the user may push the keys on the control panel base 12 to control the CD player 2 to operate. It does not need any computer to control the CD player 2 in the present invention, so it becomes more convenient to carry the CD player 2 if necessary.

Although only the preferred embodiments of this invention were shown and described in the above description, it is requested that any modification or combination that comes within the spirit of this invention be protected.

What is claimed is:

1. A control device to drive and control a CD player or CD writer, comprising a CD player base and a control panel base connected to the base; wherein said control panel base comprises a LCD display and a control panel with a plurality of keys; an interface slot and a plurality of terminal ports are located on a front and back of said control panel base, respectively; said control device further comprises a CPU, which is connected to audio in/out ports, video in/out ports, speaker, microphone, LCD display, power port, remote control keyboard, CD/RW Driver, and expanded memory/ROM so that said CD player or CD writer can play a CD without any support by a computer when said interface port of the CD player is inserted to said interface slot.

* * * * *